United States Patent [19]

Brasfield

[11] 4,288,830
[45] Sep. 8, 1981

[54] OVERVOLTAGE PROTECTOR

[75] Inventor: Robert G. Brasfield, Seattle, Wash.

[73] Assignee: The Boeing Company, Seattle, Wash.

[21] Appl. No.: 30,487

[22] Filed: Apr. 16, 1979

[51] Int. Cl.³ .............................................. H02H 3/20
[52] U.S. Cl. ...................................... 361/56; 361/91; 361/111
[58] Field of Search ..................... 361/54–56, 361/91, 111, 110; 307/252 R, 252 B, 252 T, 252 N, 252 Q

[56] References Cited

U.S. PATENT DOCUMENTS

| | | | |
|---|---|---|---|
| 3,277,460 | 10/1966 | Heckman | 328/118 X |
| 3,333,114 | 7/1967 | Molnar et al. | 307/236 X |
| 3,375,405 | 3/1968 | Fallon et al. | 361/56 |
| 3,443,223 | 5/1969 | Kennon | 324/72 |
| 3,469,188 | 9/1969 | Hall | 324/72 X |
| 3,475,653 | 10/1969 | Odenberg et al. | 361/55 |
| 3,493,815 | 2/1970 | Hurtle | 361/91 X |
| 3,573,550 | 4/1971 | Baker, Jr. | 361/71 X |
| 3,603,843 | 9/1971 | Clements | 361/111 X |
| 3,934,175 | 1/1976 | Clark | 361/91 X |

Primary Examiner—Patrick R. Salce
Attorney, Agent, or Firm—James P. Hamley; Bernard A. Donahue

[57] ABSTRACT

High voltage transients, such as from lightning strikes, on an AC carrying power line are suppressed by unique protection circuitry. Voltage on the line is sensed and should it exceed a predetermined reference level an appropriate one of two silicon controlled rectifiers is activated. The rectifiers are connected in series with a voltage dependant resistor and the resultant network is coupled between the terminals of the power line. The network is effectively an open circuit under exposure to the periodic waveform normally existing on the power line. Upon occurrence of a high voltage transient, the combination of one of the rectifiers and the voltage dependant resistor switches to a low impedance state, thereby accomplishing suppression.

1 Claim, 5 Drawing Figures

OVERVOLTAGE PROTECTOR

BACKGROUND OF THE INVENTION

The present invention pertains to the electric power art and, more particularly, to an improved overvoltage protector.

Overvoltage protectors are well known in the prior art. FIG. 1 is a schematic diagram of an overvoltage protector for use in a commercial airplane. Here, the airplane's generator 10 produces at its output terminals 12, 14 an AC voltage having a nominal peak value of 162 volts at a frequency of 400 hertz. The output from the generator 10 is passed through a feeder inductance 16, here represented as a lumped inductance, to the feeder line 20. Feeder line 20, as well as generator 10, are subject to induced high voltage transients, such as may occur due to a lightning strike on the aircraft. The high induced voltages may result in damage to the aircraft's electrical equipment (not shown). Thus, a lightning protector, indicated generally at 24, is provided between the generator's terminals 12, 14.

The lightning protector 24 includes a voltage sensing device 30 which is wired directly across the generator's terminals 12, 14 and includes internal circuitry (not shown) which senses the voltage on the line. If the peak voltage exceeds 250 volts, the voltage sensing device 30 produces a trigger signal at its outputs 32, 34. While a detailed schematic diagram of the voltage sensing device 30 is not shown herein, such circuits are well known to the prior art.

The trigger signals produced at the outputs 32, 34 of the voltage sensing device 30 are coupled via transformers 40, 42, respectively, to the gate-cathode connections of a pair of silicon controlled rectifiers 50, 52. The silicon controlled rectifiers 50, 52 are connected in parallel and in reverse polarity such that the anode of one rectifier connects to the cathode of the other. As shown, the common connection of the anode of the first silicon controlled rectifier 50 with the cathode of the second 52 connects to the second generator terminal 14.

The common connection formed by the cathode of the first SCR 50 and the anode of the second SCR 52 connects through a network, indicated generally at 60 formed by the parallel connection of a capacitor 62 and a resistor 64, to the feeder line 20. Also shown in FIG. 1 is a lumped capacitance 70 connected across the generator terminals 12, 14 which represents the total shunt capacitance due to equipment tied to the line.

Operation of the prior art voltage protector 24 shown in FIG. 1 may be understood as follows. During normal operation of the system, the voltage produced by the generator 10 at its output terminals 12, 14 does not rise to the threshold of the voltage sensing circuit 30 and thus the SCR's 50, 52 are biased off. Capacitor 62, thus, is normally discharged and, in effect, is connected only to the generator feeder line 20.

If a transient voltage, such as may be caused by lightning, is induced into the generator feeder 20, it is detected by the voltage sensing device 30 when it has risen to 250 volts. A trigger voltage is then applied to the gates of both SCR's 50 and 52. One of these will be switched on depending on whether the feeder voltage is positive or negative. That is, SCR 50 is switched on for negative feeder voltages whereas SCR 52 will switch on for positive feeder voltages. The switching on of one of the devices 50, 52 causes one end of capacitor 62 to be clamped near the potential at generator line 14, which is commonly airplane ground.

At the instant when the overvoltage protector 24 fires, capacitor 70 will be charged to 250 volts. A resultant large, very fast rising current spike flows from capacitor 70 to capacitor 62 tending to equalize their respective voltages. Also, current from the lightning protector 24 must briefly replace a large part of the load current which had previously been flowing in the feeder inductance 16. Thus, very high currents exist at the time of protector firing.

The capacitance of capacitor 62 must be large enough to absorb the current that flows to the protected point on the generator feeder due to the lightning induced transient without allowing that protected point to rise to a voltage which might damage load equipment.

The subject matter of the instant invention includes the recognition of a problem with the circuit of FIG. 1 which can result in damage to one or both of the SCR's 50, 52. It has been discovered that damage to the SCR's can be caused if the lightning protector 24 is triggered at a time when capacitor 62 retains a residual charge from a previous cycle of operation. As an example, assume that a positive transient causes SCR 52 to be triggered shortly after zero crossing of a positive half cycle of the 400 Hertz power frequency. Capacitor 62 will absorb the transient and, if not charged to a higher voltage by the transient, will charge to the 162 volt peak of the 400 Hertz AC voltage. SCR 52 turns off when the forward flow of current ceases. The time constant of capacitor 62 and resistor 64 is long, so that if a second transient occurs within the time of a few cycles of the 400 Hertz, capacitor 62 will still retain most of the charge from the first transient suppression. If the second transient is negative, the instantaneous voltage at the cathode of SCR 50 relative to ground terminal 14 when it is triggered will be as great as $-410$ volts, i.e., $-160$ volts due to the residual charge on capacitor 62 plus $-250$ volts on the feeder. This high voltage may result in a destructive current surge through SCR 50. If the negative transient also occurs during a negative half cycle of the 400 Hertz power waveform, the probability and severity of damage may be increased due to load current displacement and a high final reverse charge on capacitor 62.

Further, lightning does not always occur in single strokes. Should a re-strike occur, the capability of capacitor 62 to absorb the feeder induced transient is reduced if the second transient is of the same polarity as the residual charge on capacitor 62.

In alternate prior art transient suppression circuits, a voltage responsive resistance is placed directly across the line. A voltage responsive resistance has a non-linear voltage response, exhibiting a relatively high impedance at all voltages below a certain threshold and a relatively low impedance for any applied voltage above the threshold. Thus, the threshold of the device is selected to be above the peak of the nominal generator voltage on the line, thereby maintaining the device in a high impedance state. Upon the occurrence of a high voltage transient, the device switches to its low impedance state, suppressing the transient to ground.

A fundamental problem with such prior art constructions is that any voltage responsive resistance device has a small constant resistance in series with it. For high peak transient currents, such as produced by a lightning strike, the voltage drop across the constant resistance is sufficiently high such that when it is added to the threshold voltage of the device the resulting voltage across the line is excessive.

Thus, there is a need in the prior art for an overvoltage protector which does not suffer the above-described deficiencies.

SUMMARY OF THE INVENTION

It is an object of this invention, therefore, to provide an overvoltage protector design which does not suffer the deficiencies known to the prior art protectors.

Briefly, according to the invention, an overvoltage protector is adapted to be coupled across the terminals of a power line, which power line normally carries a nominal AC voltage and which is subject to induced high voltages exceeding the AC voltage. The protector includes a voltage sensing means which senses the voltage on the line and generates a trigger signal upon the voltage exceeding a predetermined reference level representative of an induced high voltage. Switching means responds to a generated trigger signal to switch from a high to a relatively low impedance, said switching means being adapted to be coupled to one terminal of the power line. A voltage responsive resistance means couples to the switching means and is adapted to be coupled to the remaining terminal of the power line. The voltage responsive resistance means exhibits a relatively high impedance for said nominal voltages on the line and exhibits a relatively low impedance in response to an induced high voltage, exceeding a predetermined voltage threshold, thereon.

DETAILED DESCRIPTION OF THE PREFERRED EMBODIMENTS OF THE INVENTION

Figure 1:
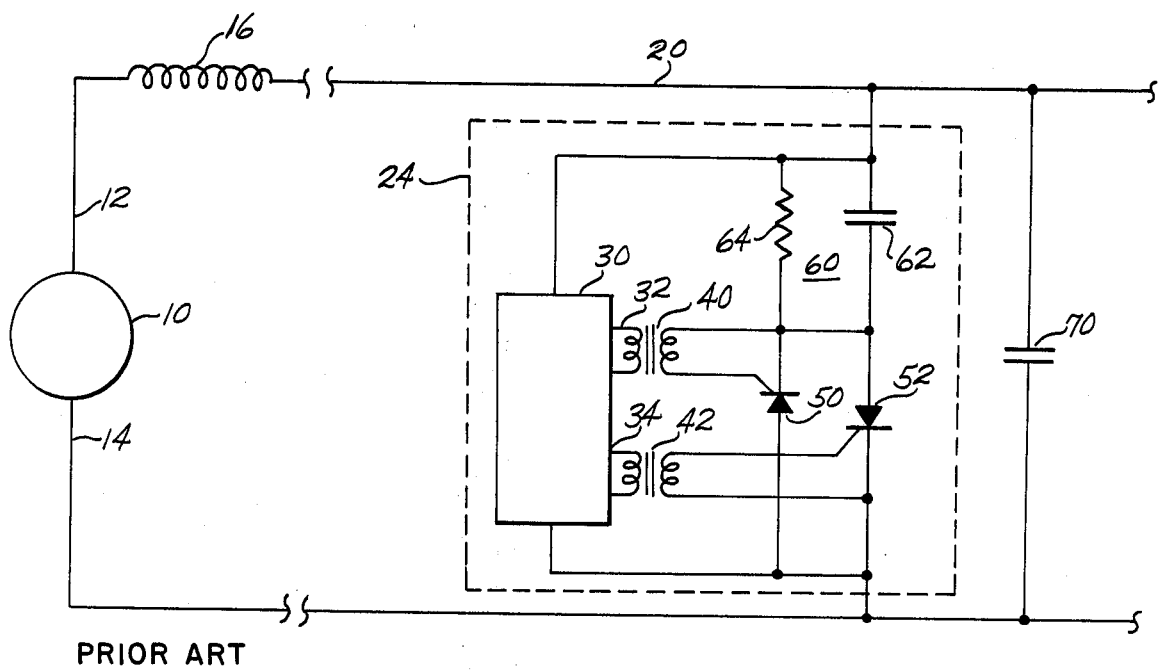
FIG. 1 is a schematic diagram illustrating an aircraft generator system including the prior art overvoltage protector.
Figure 2:
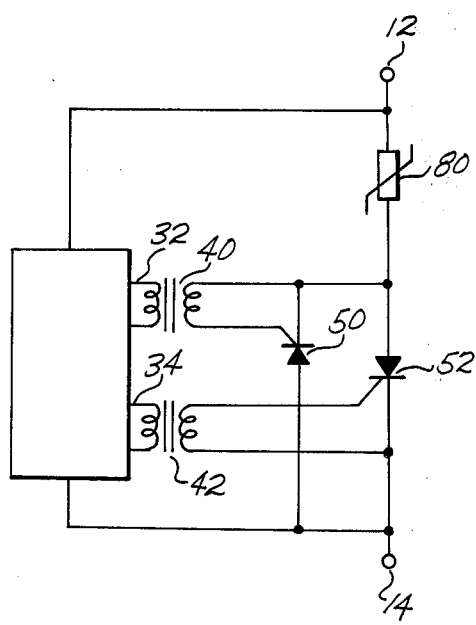
FIG. 2 is a schematic diagram of a first preferred embodiment of the overvoltage protector according to the invention.

FIG. 2 is a schematic diagram of the first preferred embodiment of the overvoltage protector. Here, as in FIG. 1, the protector includes a voltage sensing circuit 30 which monitors the voltage on the power line at terminals 12, 14 and produces trigger signals at its outputs 32, 34 in response to the voltage on the line exceeding a predetermined level. The trigger voltages are transformer coupled via transformers 40, 42 to the gate-cathode connections of a pair of oppositely polarized, parallel connected silicon controlled rectifiers (SCR's) 50, 52. The common connection of the anode of SCR 50 and the cathode of SCR 52 connect to ground terminal 14.

The principal difference between the preferred embodiment of FIG. 2 and the prior art as shown in FIG. 1 is that a voltage variable resistance 80 connects from the common connection of the cathode of SCR 50 and anode of SCR 52 to the power terminal 12. The voltage variable resistor has a symmetrical, bidirectional voltage versus current characteristic. It exhibits a relatively high impedance up to a certain value of impressed voltage at which point it breaks down into a low dynamic resistance and is capable of passing high current.

In operation, the SCR's block any current flow in the voltage variable resistor 80 except when a voltage exceeding 250 volts causes one of the SCR's to be triggered on. When this occurs that SCR fired remains on until the earlier of the next zero crossing of the 400 Hertz waveform or the switching of voltage variable resistor 80 back to its high impedance state and large currents may flow in the voltage variable resistor 80 due to the peak of the 400 Hertz voltage as well as to the transient. Voltage variable resistors are capable of enduring such peak currents for several cycles of the 400 Hertz waveform.

Since the voltage variable resistor does not employ capacitance which would store charge, as in the example of FIG. 1, the circuit as shown in FIG. 2 is capable of suppressing transients induced by lightning re-strike just as effectively as it suppresses the initial transient. Moreover, the stress imposed on the SCR's is not increased during a second transient by stored energy effects, as occur in the prior art circuit as shown in FIG. 1.

In addition, since voltage variable resistor 80 does not switch to its low impedance state until one of the rectifiers 50, 52 is fired, its threshold voltage can be selected to be lower than the peak AC generator voltage. Now, high transient current through the device 80 produce a voltage across the device's small inherent resistance which, when added to the threshold voltage of the device, maintains the voltage across the line during a transient to a safe level.

While a single voltage variable resistor 80 is illustrated in FIG. 2, it should be understood that a multiple series/parallel combination of such devices may be used to realize the desired voltage and pulse energy dissipation characteristics.

Figure 3:
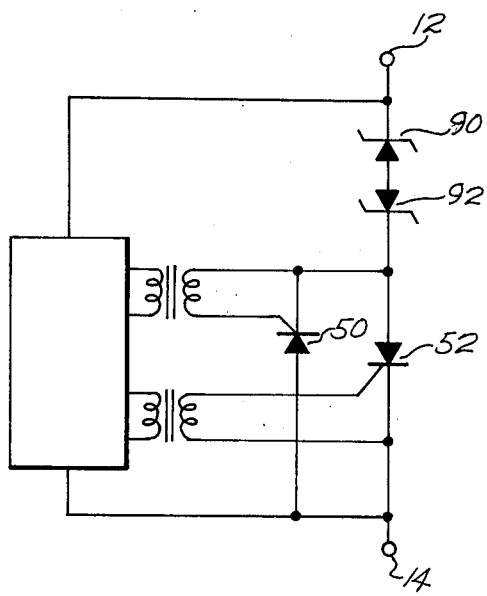
FIG. 3 is a schematic diagram illustrating a second preferred embodiment of the overvoltage protector according to the invention.

In the embodiment shown in FIG. 3, the voltage variable resistor 80 of FIG. 2 is replaced with series connected, back to back Zener diodes 90, 92. The threshold values of the Zener diodes 90, 92 are selected to satisfy the same design criteria as in selecting the voltage variable resistor, that is, to accomplish transient suppression to the lowest practical level yet not pass excessive current due to voltage peaks of the 400 Hertz waveform. Thus, for example, upon a positive transient SCR 52 is triggered on and current is passed through forward biased Zener diode 92 and through Zener diode 90 biased in the Zener mode. As with the embodiment shown in FIG. 2, the system of FIG. 3 is capable of handling lightning re-strikes and does not present a higher stress on the SCR's due to stored energy after the first transient.

Whereas only two Zener diodes 90, 92 are illustrated in FIG. 3, it should be understood that any multiple of series and/or parallel connected diodes may be used to realize the values required for a given application.

Figure 4:
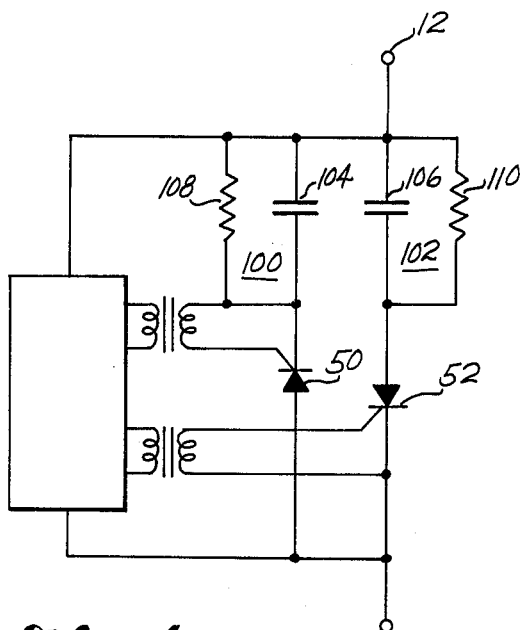
FIG. 4 is a schematic diagram illustrating a third preferred embodiment of the overvoltage protector according to the invention.

The third embodiment shown in FIG. 4 differs in two respects. First, the cathode of SCR 50 is not connected to the anode of SCR 52. Also, in place of a voltage variable resistor or a Zener diode, a pair of networks 100, 102, each comprising a capacitor 104, 106 and a parallel connected resistor 108, 110, respectively, connect from the corresponding SCR 50, 52 to the terminal 12. By separating the current paths for the SCR's 50, 52 and providing each with a bleeder resistor 108, 110, the transient re-strike failure mode can be avoided. Hence, upon the occurrence of a positive overvoltage transient, capacitor 106 is charged whereas if a subsequent transient occurs during a negative transition of the 400 Hertz waveform this is handled through capacitor 104 and thus the charge stored on capacitor 106 does not contribute to peak currents through, and peak voltages across SCR 50 which would otherwise tend to damage it.

Figure 5:
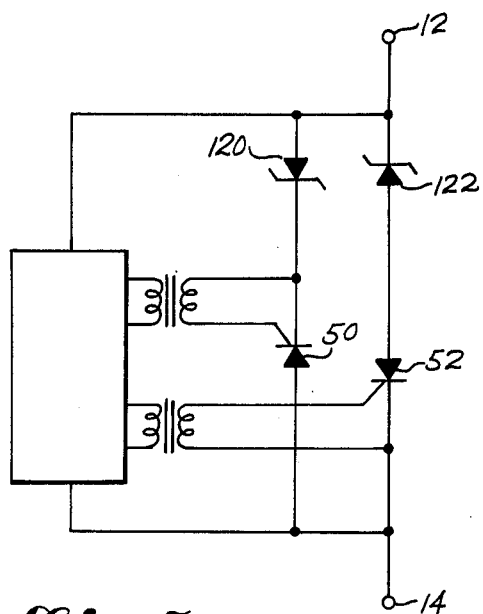
FIG. 5 is a schematic diagram illustrating a fourth preferred embodiment of the overvoltage protector according to the invention.

It should be noted, however, that while this embodiment is effective in suppressing re-strike transients of the opposite polarity, the embodiments of FIGS. 2, 3 and 5 provide improved re-strike suppression of either polarity transient.

FIG. 5 illustrates yet a fourth embodiment of the invention. Comparing this with FIG. 4, the R/C networks 100, 102 are replaced with properly polarized Zener diodes 120, 122. The threshold values of the diodes 120, 122 are selected by the same criteria as the Zener diodes of the embodiment shown in FIG. 3 Uupon an appropriate high voltage transient appearing on the terminals 12, 14 either Zener diode 122 and SCR 52, for a positive transient, or Zener diode 120 and SCR 50, for a negative transient, are turned on thus suppressing the high voltage transient.

As with the embodiments shown in FIGS. 2-4, a system according to the schematic shown in FIG. 5 does not suffer a transient re-strike problem and does not store charge which might otherwise cause damage to one of the SCR's.

In summary, a series of embodiments of overvoltage protectors has been shown which overcome the transient re-strike and stored charge problems known to the prior art.

While preferred embodiments of the invention have been described in detail, it should be apparent that many modifications and variations thereto are possible, all of which fall within the true spirit and scope of the invention.

I claim:

1. An overvoltage protector adapted to be coupled across the terminals of a power line, which power line normally carries a nominal AC voltage and is subject to induced high voltages exceeding the AC voltages, the protector comprising:

voltage sensing means for sensing the voltage on the line and generating a trigger signal upon said voltage exceeding a predetermined reference level representative of an induced high voltage;

a pair of silicon controlled switching devices connected such that the anode of one connects to the cathode of the other with the resulting common connection being adapted to be coupled to one terminal of the power line; and a pair of circuit networks, each network comprised of a predetermined value bleeder resistor in parallel with a predetermined value capacitor, each network connected at one end to one of said silicon controlled devices with the remaining end of each network adapted to be coupled to the remaining terminal of the power line, said voltage sensing means, silicon controlled switching devices and circuit networks cooperating such that an overvoltage of a first polarity on the power line is suppressed through the operation of one of said silicon controlled switching devices and its associated circuit network whereas an overvoltage of an opposite polarity on the power line is suppressed through the operation of the other silicon controlled switching device and its associated circuit network, thereby preventing an excessive voltage buildup across, and peak currents through either of said capacitors.

* * * * *